April 15, 1952   J. P. HENDERSON   2,592,569
PRESSURE RESPONSIVE MEASURING APPARATUS
Filed March 14, 1951   4 Sheets-Sheet 1
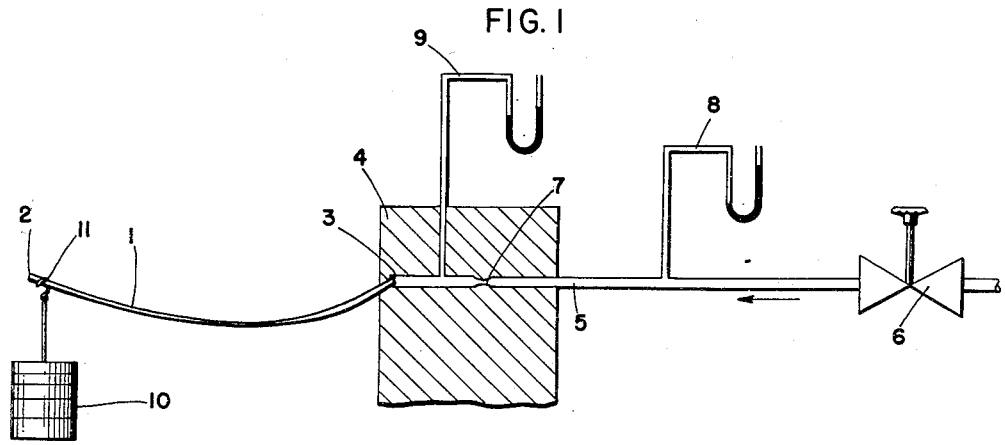
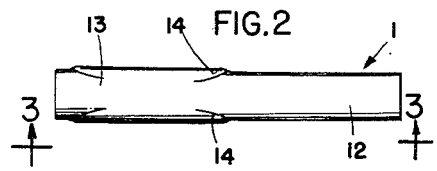
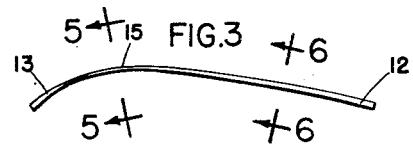
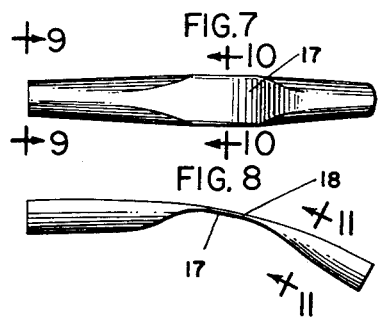
INVENTOR:
JAMES P. HENDERSON
BY
ATT'YS

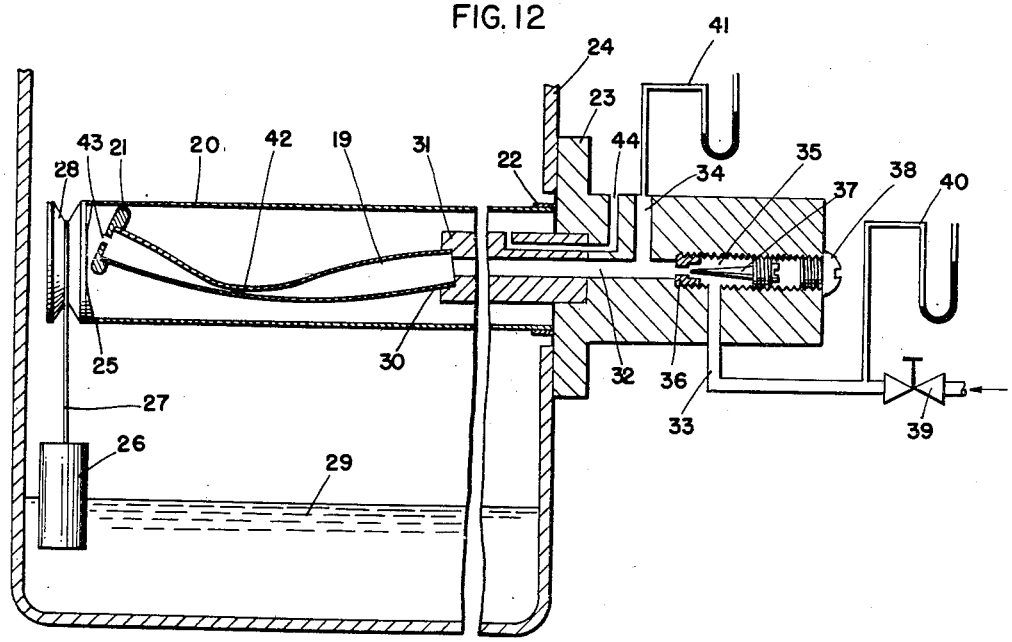
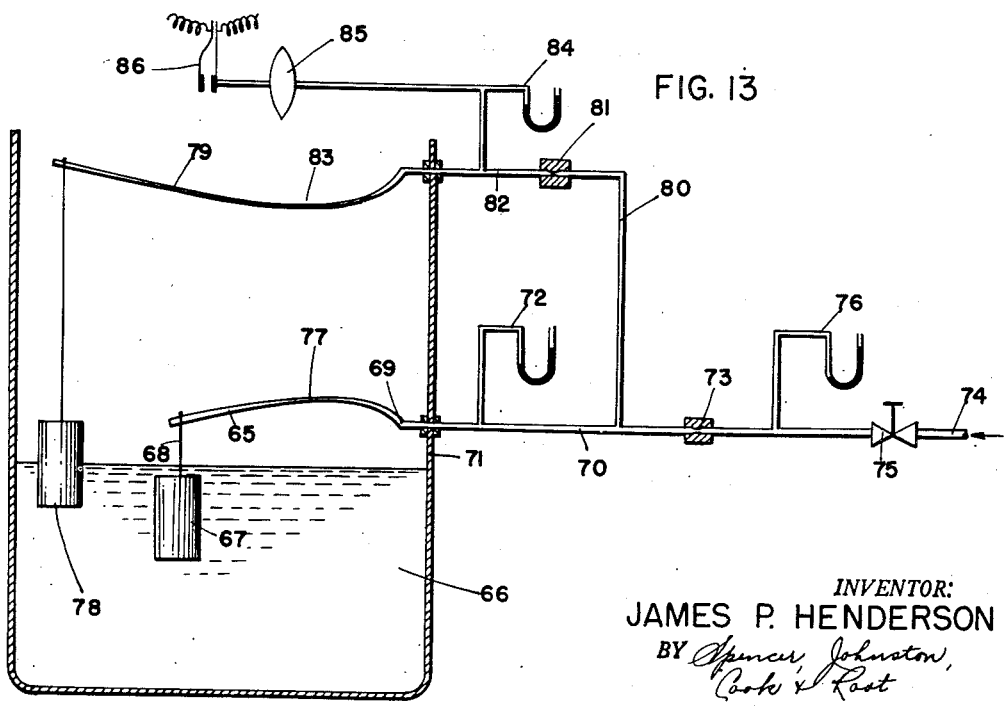

April 15, 1952     J. P. HENDERSON     2,592,569
PRESSURE RESPONSIVE MEASURING APPARATUS
Filed March 14, 1951     4 Sheets-Sheet 3

*INVENTOR:*
JAMES P. HENDERSON
BY Spencer, Johnston,
Cook & Root
ATT'YS

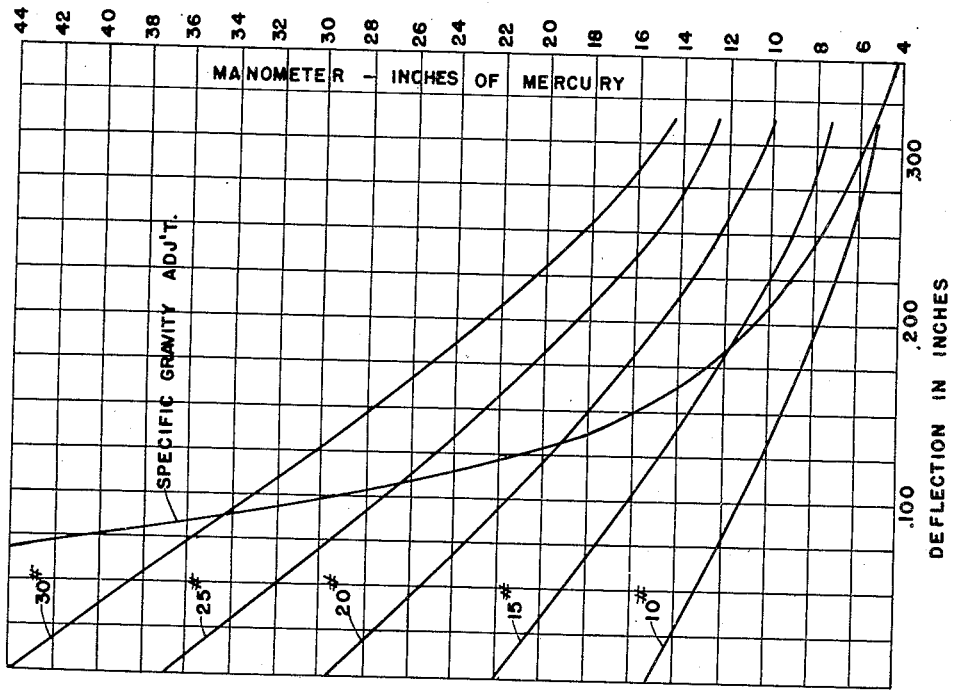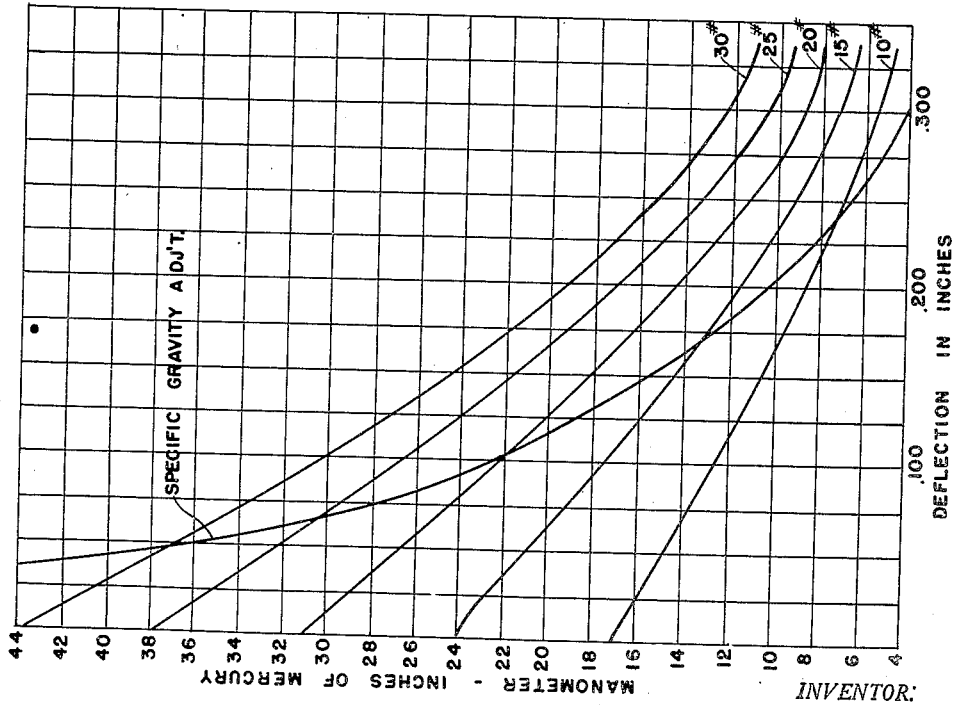

Patented Apr. 15, 1952

2,592,569

UNITED STATES PATENT OFFICE 2,592,569

PRESSURE RESPONSIVE MEASURING APPARATUS

James Pirie Henderson, La Grange Park, Ill., assignor to McAlear Manufacturing Company, Chicago, Ill., a corporation of Illinois Application March 14, 1951, Serial No. 215,400

6 Claims. (Cl. 73—228)

This invention relates to the measurement of changes in force in a system and particularly to a device for measuring changes in force, weight, dimension, position or attitude in terms of the magnitude of deflection or distortion of a flattened, resilient conduit through which a fluid is flowing.

It is an object of the invention to provide an apparatus for measuring changes of the type described in terms of the change in cross-sectional area of a restricted portion of a flattened, resilient conduit.

Another object of the invention is to provide an apparatus for measuring changes in pressure, temperature, fluid level, flow rates and dimension in terms of the rate of flow of a fluid through a resilient, flattened conduit.

A further object of the invention is to provide an apparatus for measuring changes of the type described in terms of a pressure differential established by the flow of fluid through a flattened resilient conduit across an orifice in series therewith.

These and other objects and advantages of the invention will become more apparent on a consideration of the following description taken in connection with the accompanying drawings in which:

Figure 1 is a schematic view of one simplified form of an apparatus according to the invention;

Figure 2 is a plan view of one form of conduit for use in the apparatus of the invention;

Figure 3 is an elevational view of the conduit of Figure 2 taken along the lines 3—3 of Figure 2;

Figure 4 is an end view of the tube illustrated in Figure 2;

Figure 5 is a sectional view taken along the line 5—5 of Figure 3;

Figure 6 is a sectional view taken along the lines 6—6 of Figure 3;

Figure 7 is a plan view of another form of the conduit of the present invention;

Figure 8 is a side elevational view of the conduit of Figure 7;

Figure 9 is an end view taken along the lines 9—9 of Figure 7;

Figure 10 is a sectional view taken along the lines 10—10 of Figure 7;

Figure 11 is an end view taken along the lines 11—11 of Figure 8;

Figure 12 is a sectional view illustrating one embodiment of the invention in actual use;

Figure 13 is a sectional view of another embodiment of the invention in actual use;

Figures 16 and 17 are graphs showing change in pressure vs. deflection of spring conduits corresponding in shape to the tube of Figure 2, for various regulated input pressures.

Figure 15:
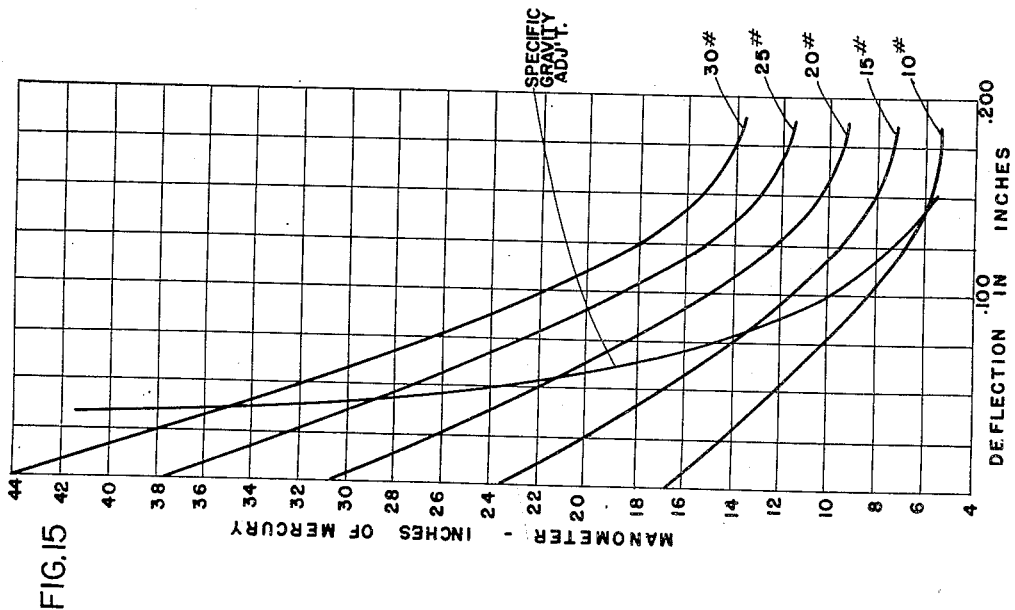
Figure 15 is a graph showing changes in pressure vs. deflection of the spring conduit of Figure 7 for various regulated input pressures.

The invention presents an entirely new principle for measuring changes in force. The force may result from changes in weight, changes in quantity or dimension or changes in physical conditions such as pressure, temperature, velocity, liquid level and specific gravity. The force is measured in terms of the change in cross-sectional area of a flattened resilient conduit by increasing the tensional stress on one wall and the compressional stress on the opposite wall. Stated in another way, the force is measured in terms of the magnitude of deflection or distortion of a flattened, resilient conduit since the deflection will cause a corresponding change in the cross-sectional area of a portion of the conduit.

A fluid under pressure is flowed through the conduit and the variation in pressure resulting from the change in internal cross-sectional area of the conduit is a function of the deflecting force operating on the conduit to deflect it. The variation in pressure on the fluid flowing through the conduit may be recorded and/or employed as a measure of the magnitude of the displacement of the tip of the tube. The changing pressure differentials in the device are transmitted to a means which is responsive to changes in pressure differentials in proportion to the magnitude of deflection of the resilient conduit. The pressure responsive means may be a manometer, gauge, diaphragm or other suitable operating device.

In Figure 1 of the drawings a simplified schematic form of the invention is illustrated. A curved, flattened, resilient conduit 1 is shown having open ends 2 and 3. The open end 3 is rigidly secured to a supporting member 4 and is in fluid communication with the conduit 5. A stream of fluid under pressure is adapted to be passed through the conduit 5 from a suitable source, not shown, and the supply of fluid is controlled by a valve 6. Valves 6, 39, 57 and 75 are adjustable pressure reducing and regulating valves which admit air to the apparatus at a regulated pressure and are used to maintain a constant down-stream pressure as indicated, for example, by manometer 8. A constricting orifice 7 is located in the conduit 5 at a point downstream from the valve 6. The manometer 8 is located upstream from the orifice 7 and the manometer 9 is located downstream therefrom intermediate the orifice 7 and the conduit 1. A weight 10 is adapted to be attached to the free end 2 of the conduit 1 by means of the hook 11.

When fluid at a pressure regulated by the pressure regulator 6 is allowed to flow in series through the orifice 7 and the curved, flattened, resilient conduit or spring tube 1 to the atmosphere, a pressure differential is established across the orifice 7. The magnitude of the fluid pressure on the low side of the orifice 7 will depend upon the resistance offered to the flow of fluid by the curved conduit 1. In the position illustrated in Figure 1 the cross-sectional area of the conduit 1 will be increased as the open end 2 of the conduit 1 is deflected downwardly in the direction which will tend to straighten the curved portion of the conduit.

This mechanical displacement downwardly of the free end 2 of the conduit 1 increases the tensional stress in the upper wall of the conduit and the compressional stress in the lower wall to cause an increase in the internal cross-sectional area of a selected portion of the conduit. As the cross-sectional area increases, the resistance to flow of fluid through the conduit 1 will be reduced. The pressure on the manometer 9 will be correspondingly reduced and can be visually observed. The differential pressure across the orifice 7, as measured by the difference in pressures indicated by the upstream manometer 8 and the downstream manometer 9, is then a measure of the change in cross-sectional area of the conduit 1, and of the magnitude of the deflectional load or force applied by the weight 10 to the open end 2 of the conduit 1. Stated another way, the pressure differential indicated by the manometers 8 and 9 is a measure of the magnitude of deflection of the spring conduit 1.

The conduit or tube 1 may have a number of forms and still be effective for the purposes of the invention. It is essential for the practice of the invention that the conduit be of such design that a change in cross-sectional area will occur in the conduit when it is deflected or distorted. This change in cross-sectional area is preferably achieved by the use of a curved, flattened conduit of a springy or resilient material.

Figures 2-6 illustrate one embodiment of a conduit which is well adapted for the practice of the invention. In Figure 2 it will be seen that the conduit 1 is comprised of a narrow portion 12 and a wider portion 13. The two portions are blended at the shoulder areas 14. From Figures 4, 5 and 6 it will be seen that the conduit is flattened throughout its length and has areas of different cross-section. From Figure 3 it will be noted that the wide portion 13 is curved substantially from the plane of the narrow portion 12. The curve is concentrated at the portion 15 which is also considerably smaller in cross-sectional area (Figure 5) than the remainder of the conduit. In this form of conduit the deflection will be concentrated at the portion 15 where it will be possible to effect a substantial change in cross-sectional area by increasing the tensional stress of one wall and the compressional stress of the other. In this embodiment of the invention it is preferred to apply the deflectional force to the conduit in such manner to straighten it from the curved position. This action causes an increase in the cross-sectional area of the portion 15 thereby reducing the resistance to fluid flow through the conduit. It should be understood that the deflectional force may be applied to the conduit in any suitable manner to either curve or straighten it as desired.

In Figures 7-11 another form of conduit is illustrated. In this form a round tube 16 such as that shown in Figure 9 is flattened and curved at a central portion 17 so that the deflection of the tube will be concentrated at this point. The constricted portion 18, as illustrated in Figure 8, offers considerable resistance to the flow of fluid through the conduit. Upon the application of deflectional force to the conduit, the cross-sectional area at the constricted portion 18 will be changed with a resulting increase or decrease in the resistance to flow depending upon the direction in which the tube is deflected. It would be possible to include a considerable number of similar designs for conduits useful in the practice of the invention, but it is not deemed necessary to include further modifications of the conduit since the principle thereof has been fully set forth herein.

The resilient conduit of this invention may have various designs and may be made of any suitable material. It is important that the conduit be readily flexible, but it must also be capable of returning to its normal position when the flexing force is relaxed. Spring metals are particularly suitable, such as brass or steel tubing, but any other metal, plastic or rubber-like material may be employed which has the necessary resilient qualities.

The applications of the invention are numerous and varied and it may be used for the measurement of any deflectional or distortional force or change in dimension, attitude or position. For example, it may be employed for such varied uses as the continuous weighing of a material, the measurement of liquid level or of the level of any flowing material such as a fluidized solid, i. e., a solid carried in a fluid. It may also be used to measure the rate of flow of fluids under pressure, the specific gravity of liquids, fluid pressure, temperature, changes in dimension of a solid and rates of expansion. The apparatus is especially applicable to the automatic control of the above forces and may be combined with other controlling devices to regulate pressure, temperature, liquid level, flow of fluids and the like. As will be disclosed hereinafter, two or more embodiments of the apparatus of this invention may be operated together to measure and control two or more variables of pressure, temperature, liquid level, specific gravity and the like. The following specific applications of the invention are presented for illustrative purposes only and are not intended as limitations of the invention.

Figure 12 shows an arrangement for the measurement of liquid level and it will be obvious that the arrangement may also include automatic control of liquid level. That is, the pressure in conduit 9 may be transmitted to a pressure responsive control device which operates to reestablish a desired level. In many instances it will be desirable to avoid the effect on the measuring apparatus of changing pressure in a closed vessel. In the embodiment illustrated herein a flattened, resilient conduit 19 is positioned in a prestressed condition within a cylindrical, resilient tube 20 and contact member 21. The member 21 is adapted to fit about the open end of the conduit 19 which is prestressed in such manner as to maintain cap member 21 in firm contact with tube 20 throughout the operating range of the unit. The tube 20 is secured to a support ring 22 which in turn is attached to a body member 23. The body member is positioned in the wall 24 of a vessel in fluid-tight engagement therewith.

The opposite end 25 of the resilient spring tube 20 is free to move upwardly or downwardly in response to the action of a deflecting force. A displacer 26 is attached to the end 25 by means of the supporting element 27 which engages the spool 28 which in turn is rigidly secured to the end 25. A supply of liquid 29 is maintained in the vessel. The fixed end 30 of the conduit 19 is rigidly positioned in the hollow tube support member 31 which is attached to the body member 23. The tube support 31 and the body 23 have the fluid supply conduits 32, 33 and 34 located therein. The supply conduit 32 connects the resilient conduit 19 with the conduit 33 in such fashion that a supply of fluid under pressure will flow continuously therethrough.

An adjustable orifice assembly is located between the supply conduits 32 and 33. The orifice assembly is comprised of an orifice member 36, an adjustable needle 37 and a cap screw 38 for sealing the threaded portion of the channel 35. The supply of fluid is regulated at a predetermined pressure by means of the regulator 39 in the conduit 33. A manometer 40 or other suitable registering device is located on the conduit 33 to register the pressure on the upstream side of the orifice. The conduit 34 is integral with the conduit 32 and communicates a portion of the fluid under pressure to the downstream manometer 41. This manometer is located on the opposite side of the orifice member 36 from the upstream manometer 40 and comparison of the readings on the two manometers establishes the pressure differential set up by the orifice member 36.

The flow of fluid through the tube 19 will be established by the pressure drop across the restricted portion 42. The magnitude of restriction of the flow of fluid through the area 42 of the tube 19 will be indicated by the change in pressure on the manometer 41. With the displacer 26 hanging freely in the atmosphere, the tube 20 will be stressed downwardly in proportion to the weight of the displacer. The conduit 19 will likewise be stressed downwardly by a corresponding amount since the tube 20 and the conduit 19 are in contact. As liquid rises about the displacer, the deflectional force on the tube 20 and on the resilient conduit 19 will be reduced by an amount equal to the weight of the volume of liquid displaced. As liquid continues to rise around the displacer 26, the tube 20 and the conduit 19 will relax to approach neutral position and the conduit 19 will flex upwardly, thereby reducing the cross-sectional area of the restricted portion 42.

As the cross-sectional area is reduced, the resistance to the flow of fluid through the conduit 19 will be increased and the fluid pressure in the conduit 32 will be increased and will be indicated on the manometer 41. The variations in pressure as indicated by the manometer 41 are a function of the change in cross-sectional area of the restricted portion 42 which in turn is a function of the change in amount of deflectional force.

It will be apparent that the fluid which passes through the portion 42 must be vented to the atmosphere in order to prevent the build-up of back pressures which would affect the operation of the device. An opening 43 is provided in the free end of the conduit 19 and the fluid under pressure will pass through the opening, backward through the tube 20 and through the exhaust vent 44 to the atmosphere.

Figure 14:
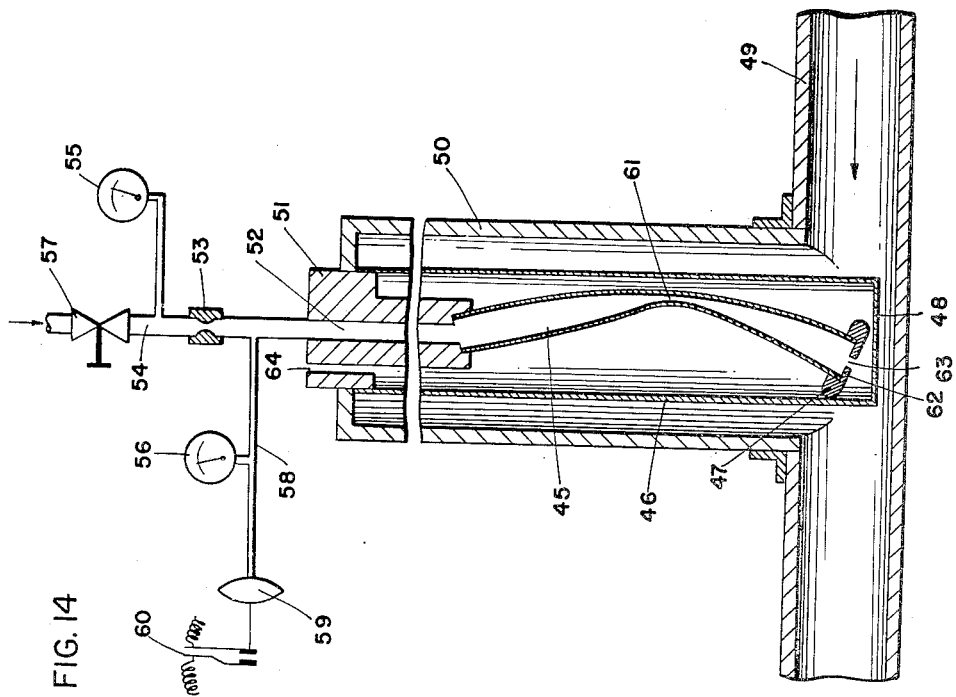
Figure 14 is a sectional view of still another embodiment showing the apparatus of the invention in another of its uses.

In Figure 14 another embodiment of the invention is illustrated as it is employed in the measurement and regulation of fluid flow through a pipe. The apparatus is generally similar to that described above for Figure 12 in that it has a flattened, resilient conduit 45 prestressed in a position within a resilient spring tube 46 and contacting the tube 46 by means of the contact member 47. The tube 46 is enclosed at the end 48 which is adapted to extend into and partially block a pipe 49. A housing 50 is attached to the pipe 49 and is adapted to contain the measuring apparatus and to support a body member 51 through which a supply conduit 52 is tapped. A constricting orifice 53 separates the conduit 52 from a main fluid supply conduit 54 and creates a pressure differential between the two conduits.

The upstream pressure is measured on the gauge 55 and the downstream pressure is measured on the gauge 56. The supply of fluid under pressure to the main conduit 54 is regulated by means of the pressure regulator valve 57. The pressure in the conduit 52 is transmitted to the gauge 56 through the auxiliary supply line 58 which is also connected to a diaphragm 59 which in turn is associated with suitable regulating means, such as the switch 60. Fluid under pressure is conveyed through the opening 52 into the conduit 45 where it passes through the restricted portion 61. Here again, as in Figure 12, the cross-sectional area of the restricted portion 61 will depend upon the magnitude of deflection of the conduit 45. Fluid under pressure is exhausted from the conduit 45 through the opening 63 and through the vent 64 in the body 51.

In the operation of the apparatus in Figure 14 a supply of fluid under pressure is passed through the pipe 49 in the direction indicated by the arrow. The force of the fluid will deflect the spring tube 46 and will correspondingly allow the resilient conduit 45 to relax from its prestressed position. As the conduit 45 relaxes in the direction of the arrow, the cross-sectional area of the restricted portion 61 thereof will be reduced and the pressure in the supply conduit 52 will be correspondingly increased. This increase in pressure wil be indicated in the gauge 56 and will be transmitted to the diaphragm 59, or other pressure responsive device, which in turn will actuate the switch 60 or other suitable controlling apparatus. The switch 60 may be adapted to operate a valve or pump to regulate the flow of fluid through the pipe 49. Hence, as the rate of flow in the pipe 49 increases, the pressure at the gauge 56 will increase correspondingly and the diaphragm and solenoid mechanism will operate to close a valve or slow down a pump thereby automatically reducing the bending force on the tube 46. The tube 20 in Fig. 12 and tube 46 in Fig. 14 are preferably round in cross section but under certain conditions they could be a different shape so long as they are resiliently deflectable.

Referring to Figure 1: With a constant load 10 applied to resilient number 1 an adjustment of the pressure upstream of orifice 7 and as indicated by gauge 8, by means of a resetting of pressure regulator 6, will have a correspondingly increasing or decreasing effect on the pressure as indicated by gauge 9, and will also have the effect of changing the sensitivity of the apparatus to changes in load applied to, or magnitude of deflection of resilient number 1. This effect is illustrated in Figures 15, 16 and 17 which show families of curves of pressures as indicated by manometer 9, and corresponding gauges in other figures, plotted versus magnitude of deflection of the tip of number 1 for various input regulated pressures of 10, 15, 20, 25 and 30 p. s. i. g.

Referring to Figure 15: It will be seen that the curve marked Specific Gravity Adjustment intersects each pressure versus deflection curve at a value of 9 inches less than the values corresponding to zero deflection. At 30 p. s. i. g. input pressure, a change of 9 inches of mercury pressure corresponds to a deflection of 0.036 inch. At 10 p. s. i. g. input pressure, the pressure change of 9 inches, corresponds to a deflection of 0.144 inch, or four times the motion required at 30 p. s. i. g. input pressure. Thus, by adjusting the regulated input pressure a convenient adjustment for specific gravity is obtained. The input pressure can be automatically adjusted for changes in specific gravity of the liquid by means of the arrangement shown in Figure 13 in which the input pressure of fluid to a liquid-level measuring unit according to the invention is regulated by means of another similar unit arranged to respond to a change in density of the liquid in tank 66 in such a manner as to adjust the input pressure to the liquid-level measuring unit.

Figure 13 represents an arrangement employing a series of the apparatus of the invention. The specific arrangement shown provides for automatic compensation for changes in specific gravity of a liquid whose level is to be measured and/or controlled. It will be apparent that accurate measurement or control of liquid level by the displacement method will be impossible where the specific gravity or density of the liquid is not constant. The present device automatically compensates for changes in specific gravity or density so that the liquid level may be accurately measured and/or controlled regardless of changes in specific gravity or density.

This is done by totally immersing a displacer 67 suspended by means of element 68 from a resilient conduit 65 in a body of liquid 66 of varying specific gravity. The fixed end 69 of the conduit 65 is adapted to be connected to a supply line 70 which extends through the wall 71 of the vessel. A manometer 72 or other pressure indicating or recording device is attached to the supply line 70 on the downstream side of a constricting orifice 73. A high pressure line 74 is provided with a valve 75 for regulating the flow of fluid through the system. An upstream manometer 76 is provided for indicating and/or recording the pressure upstream of orifice 73.

In the operation of this segment of the complete device a fluid under pressure is admitted through regulator 75 and through the constricting orifice 73 to the supply line 70 and through the conduit 65. The narrow flattened portion 77 of the conduit 65 restricts the flow of fluid therethrough and causes a build-up of pressure in the lines 70 and 80 which is indicated on the manometer 72. As the specific gravity of the liquid 66 increases, the completely submerged displacer 67 tends to rise in the body of liquid and to relax the conduit 65. As a result, the cross-sectional area of the portion 77 becomes larger and the back-pressure on the manometer 72 becomes lower.

The second segment of the apparatus is a liquid level responsive device of the type illustrated and described with reference to Figure 1. A displacer 78 is partially submerged in the body of liquid 66 and will deflect the conduit 79 upwardly or downwardly in response to changes in the liquid level. The previously regulated back pressure on the line 70, as indicated on the manometer 72, is employed as the adjusted primary fluid pressure conveyed to the liquid level responsive device through the line 80. Another constricting orifice 81 is employed to set up a pressure differential between the fluid in the line 80 and the fluid in the line 82. Once again the cross-sectional area of the narrow portion 83 in the conduit 79 determines the amount of back pressure on the line 82. Again it is a function of the amount of deflection of the conduit 79 in response to the movement of the displacer 78. The back pressure on the line 82 is conveyed to the manometer 84 and may be conveyed to the diaphragm or pressure responsive device 85 which in turn may operate a regulating element such as the switch 86. The switch or other suitable controlling apparatus may be connected to a valve or pump apparatus which may be controlled to automatically compensate and adjust the liquid level in the vessel. Hence, in the device described it is possible to accurately control liquid level automatically despite changes in the specific gravity of the liquid in the vessel. It will be apparent that additional units of the regulating device of the invention may be connected with that illustrated in Figure 13 in order to compensate for other variations, e. g., temperature.

In Figure 15 the relationship between the back-pressure created by the constricted cross-sectional area of the resilient conduit is graphically shown with reference to the magnitude of deflection of the conduit for a number of input pressures 10, 15, 20, 25 and 30 p. s. i. g. The graph of Figure 15 is for a curved, flattened conduit of the type generally illustrated in Figures 7–11. It will be noted that as the conduit is deflected from its curved position toward its straightened position, the back-pressure is lessened at a measurable rate. This lessening of back-pressure results from an increase in the cross-sectional area of the constricted portion of the conduit.

Figures 16 and 17 are two graphs showing the relationship between back-pressure and amount of deflection of flattened conduits of the type illustrated generally in Figures 2–6 at regulated input pressures of 10, 15, 20, 25 and 30 p. s. i. g. Here again the back-pressure is readily measurable and is found to be a function of the magnitude of deflection of the resilient conduit. Stated in another way, the back-pressure is a function of the cross-sectional area of the constricted portion of the flattened, resilient conduit, and the cross-sectional area is altered by deflecting the conduit.

From the foregoing description it will be apparent that the present invention now provides an entirely new principle by which changes in force, weight, dimension, position or attitude may be measured. Thus, not only may force be measured, but by a suitable arrangement of apparatus the present invention may be employed to regulate the amount of force and to compensate therefor. The number of applications of the invention is extremely large and many will be suggested to one familiar with the art by a consideration of the disclosure. The regulating units of the invention may be employed singly, or a number of them may be employed separately or in series to regulate a wide variety and number of variables in a given system. For example, it is possible to measure and/or regulate the specific gravity, liquid level, temperature, pressure, velocity and dimension of a given system.

The invention is hereby claimed as follows:

1. An apparatus of the class described comprising open ended resilient conduit means having a restricted portion the cross-sectional area of which varies as the result of deflection of said conduit means, pressure fluid conducting fixed conduit means connected with said resilient conduit means, means in said conduit means for establishing a predetermined initial input pressure of a fluid to said resilient conduit means, means for deflecting said resilient conduit means in response to variations in a condition, a take-off conduit connected between said input pressure establishing means and said restricted portion to transmit the resultant variable pressure, and a pressure responsive device connected to said take-off conduit.

2. An apparatus of the class described comprising open ended resilient conduit means having a restricted portion the cross-sectional area of which varies as the result of deflection of said conduit means, pressure fluid conducting fixed conduit means connected with said resilient conduit means, means in said conduit means comprising a pressure regulator and means forming an orifice for establishing a predetermined input pressure of a fluid to said resilient conduit means, means for deflecting said resilient conduit means in response to variations in a condition, a take-off conduit connected between said input pressure establishing means and said restricted portion to transmit the resultant variable pressure, and a pressure responsive device connected to said take-off conduit.

3. An apparatus of the class described comprising open ended resilient conduit means having a restricted portion the cross sectional area of which varies as a result of deflection of said conduit, a pressure tight resilient tubular shell surrounding said resilient conduit means, said tubular shell being resiliently movable at one end, fixed at the other end, in contact with said resilient conduit means adjacent the resiliantly movable end of said tubular shell and provided with a vent to the atmosphere for pressure fluid adjacent its fixed end, pressure fluid conducting fixed conduit means connected with said resilient conduit means, means in said pressure fluid conducting conduit means for establishing a predetermined input initial pressure of a fluid to said resilient conduit means, means comprising a displacer adapted to be immersed in a liquid and connected adjacent one end of said tubular shell for deflecting said tubular shell and said resilient conduit means associated therewith in response to variations in a condition of said liquid, a take-off conduit connected between said input pressure establishing means and said restricted portion to transmit the resultant variable pressure, and a pressure responsive device connected to said take-off conduit.

4. An apparatus of the class described comprising an open ended resilient conduit means having a restricted portion the cross-sectional area of which varies as a result of deflection of said conduit, pressure fluid conducting fixed conduit means connected with said open ended resilient conduit means, means in said fixed conduit means for establishing a predetermined initial input pressure of a fluid to said resilient conduit means, a displacer connected adjacent the outer end of said resilient conduit means and adapted to be totally immersed in a liquid to cause said resilient conduit means to be deflected in response to movement of said displacer in said liquid, a second open ended resilient conduit means having a restricted portion the cross-sectional area of which varies as a result of deflection of said conduit, a second displacer connected to said second resilient conduit means adjacent the outer end thereof and adapted to be partially immersed in said liquid to cause said second resilient conduit means to be deflected in response to movement of said displacer in said liquid, pressure fluid conducting fixed conduit means provided with means forming an orifice and connected with said second open ended resilient conduit means and with said first fixed conduit means between said input pressure establishing means and said restricted portion of said first resilient conduit means to transmit the fluid pressure in said first fixed conduit means to said second resilient conduit means, a take-off conduit connected between said input pressure establishing means and said restricted portion of said first resilient conduit means and another take-off conduit connected between said second resilient conduit means and said means forming an orifice to transmit the respective resultant variable pressures, and a pressure responsive device connected to each of said take-off conduits.

5. A rate of flow device comprising an open ended resilient conduit means having a restricted portion the cross-sectional area of which varies as the result of deflection of said conduit, pressure fluid conducting fixed conduit means connected with said resilient conduit means, means in said conduit means for establishing a predetermined initial input pressure of a fluid to said resilient conduit means, means for deflecting said resilient conduit means in response to variations of the rate of flow of a fluid, a take-off conduit between said input pressure establishing means and said restricted portion to transmit the resultant variable pressure, and a pressure responsive device connected to said take-off conduit, said deflecting means comprising a pressure tight resilient shell surrounding said resilient conduit means, one end of said shell being free and in contact with said resilient conduit means adjacent an end thereof, said free end of said shell being adapted to be immersed in said flowing fluid, the other end of said shell being fixed and having a vent to the atmosphere.

6. A device as claimed in claim 5 in which said resilient conduit means is prestressed to move by its own resiliency when said shell is caused to move by the flow of a fluid in contact therewith.

JAMES PIRIE HENDERSON.

REFERENCES CITED

The following references are of record in the file of this patent:

UNITED STATES PATENTS

| Number | Name | Date |
|---|---|---|
| 1,407,060 | Graemiger | Feb. 21, 1922 |
| 1,905,335 | Bijur | Apr. 25, 1933 |
| 2,037,949 | Tate | Apr. 21, 1936 |
| 2,119,288 | Raymond | May 31, 1938 |
| 2,198,452 | Lipschitz | Apr. 23, 1940 |

(Other references on following page)

UNITED STATES PATENTS

| Number | Name | Date |
|---|---|---|
| 2,223,712 | Ziebolz | Dec. 3, 1940 |
| 2,241,636 | Eliason | May 13, 1941 |
| 2,248,322 | Annin | July 8, 1941 |
| 2,261,028 | Hopkins | Oct. 28, 1941 |
| 2,321,175 | Binckley | June 8, 1943 |
| 2,422,921 | Nier et al. | June 24, 1947 |
| 2,432,082 | Bilyeu | Dec. 9, 1947 |
| 2,451,425 | Allwein | Oct. 12, 1948 |
| 2,455,285 | Versaw | Nov. 30, 1948 |

FOREIGN PATENTS

| Number | Country | Date |
|---|---|---|
| 839,703 | France | Jan. 7, 1939 |

OTHER REFERENCES

A publication entitled "A Variable Capillary Gas Leak," by R. Dudley Fowler, found in The Review of Scientific Instruments, January, 1935, vol. 6 at page 26. (A copy is in the Scientific Library of the U. S. Patent Office and a photostat copy is in 138–45.)